United States Patent [19]

Shin et al.

[11] Patent Number: 4,973,491

[45] Date of Patent: Nov. 27, 1990

[54] HONEY PRODUCT

[75] Inventors: Joy M. Shin; Samuel L. Wang, both of St. Catharines, Canada

[73] Assignee: Ontario Ministry of Agriculture and Food, Vineland Station, Canada

[21] Appl. No.: 361,927

[22] Filed: Jun. 6, 1989

[51] Int. Cl.⁵ .............................. A23L 1/08; A23L 1/36
[52] U.S. Cl. ...................................... 426/632; 426/633
[58] Field of Search ........................ 426/658, 633, 632

[56] References Cited

U.S. PATENT DOCUMENTS

| | | | |
|---|---|---|---|
| 1,158,297 | 10/1915 | Root | 426/633 |
| 1,416,387 | 5/1922 | Sell | 426/633 |
| 1,620,898 | 3/1927 | Kidd | 426/633 |
| 1,911,882 | 5/1933 | Crane | 426/633 |
| 3,772,038 | 11/1973 | Ayres et al. | 426/633 |

Primary Examiner—Jeanette Hunter
Attorney, Agent, or Firm—Jeffers, Hoffman & Niewyk

[57] ABSTRACT

A sliceable crystallized honey product and method of making the same are provided. The honey product comprises from 75% to 90% by weight honey and from 10% to 25% by weight finely ground oil-rich nut products. The honey has a solids content of from 75% to 86% by weight of the honey. Preferably, the nut products are chosen from the group comprising peanut meal and peanut flour.

21 Claims, 3 Drawing Sheets

FIG. 2A EFFECT OF ADDITIVES ON PEAK FORCE
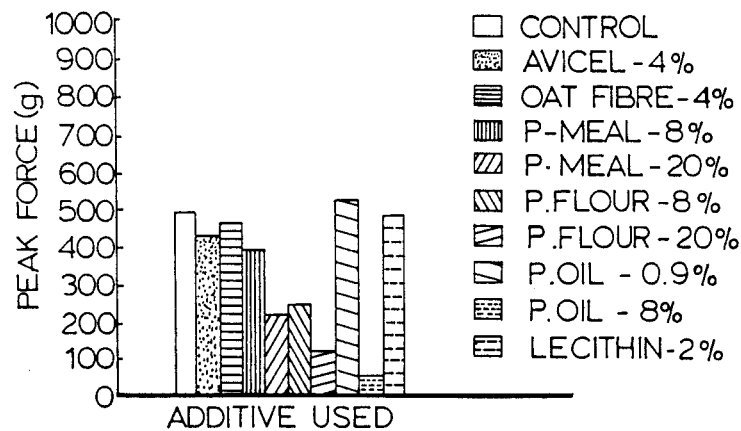
FIG. 2B EFFECT OF ADDITIVES ON ADHESIVE FORCE
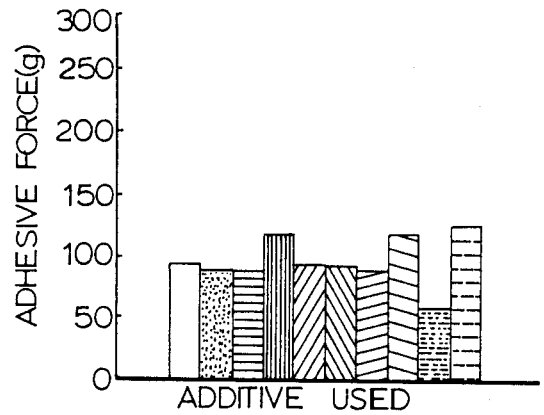
FIG. 2C EFFECT OF ADDITIVES ON COHESIVENESS
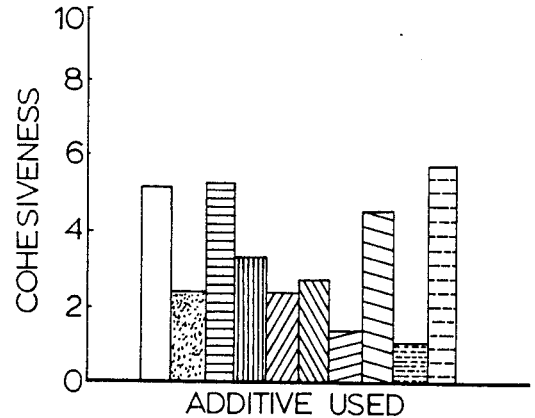

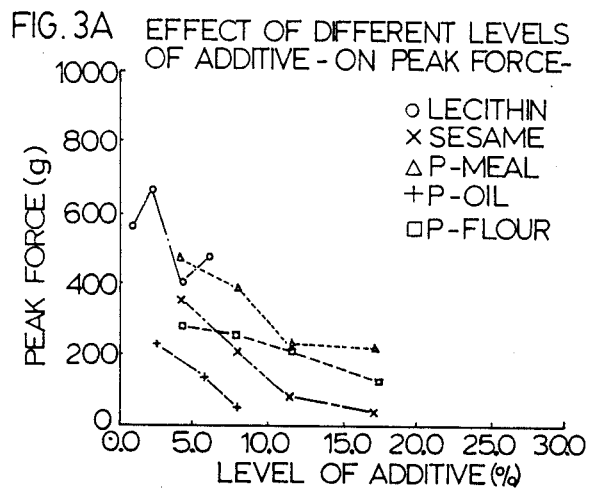
FIG. 3A EFFECT OF DIFFERENT LEVELS OF ADDITIVE - ON PEAK FORCE -
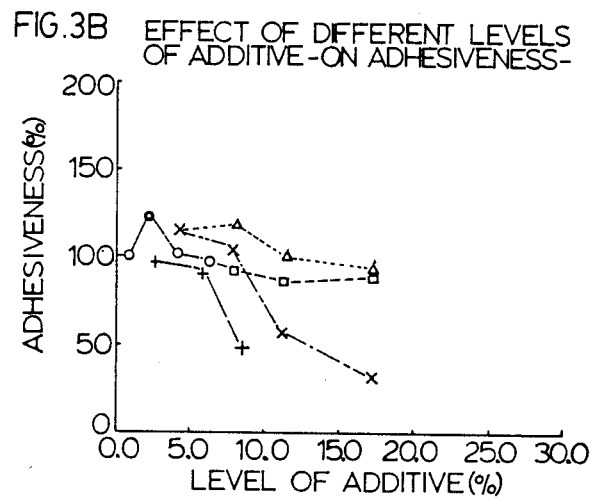
FIG. 3B EFFECT OF DIFFERENT LEVELS OF ADDITIVE - ON ADHESIVENESS -
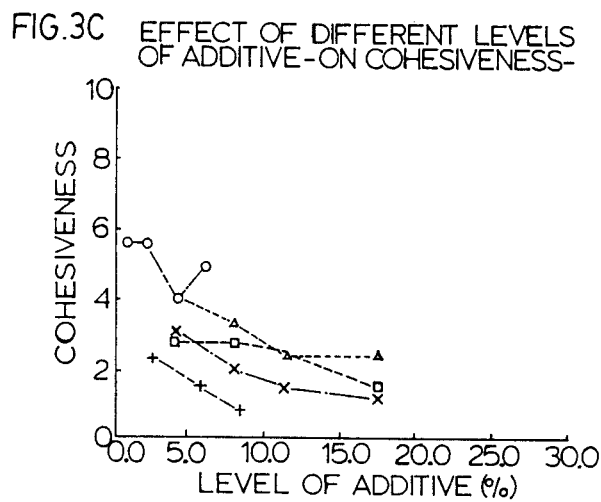
FIG. 3C EFFECT OF DIFFERENT LEVELS OF ADDITIVE - ON COHESIVENESS -

HONEY PRODUCT

The present invention relates to a food product and in particular to a honey product.

It is well known that liquid honey is difficult to handle, pour and spread and has the undesireable tendency to crystallize spontaneously during storage. Attempts have been made to overcome the crystallization problem by creaming the honey using the Dyce method (1931). This method requires seed nuclei to be added to the honey to promote controlled crystallization. However, the creamed honey formed using this method is still not very convenient to use due to its stickiness. Moreover, the creamed honey formed using this method still possesses the intense sweetness of pure honey.

Many other proposals have been attempted to overcome the handling problems associated with honey. In particular, U.S. Pat. No. 2,693,420 to Straub, discloses a solidified honey product and process for making the same. The process requires honey to be mixed with starch products followed by grinding to a fine powder to yield a sub-divided free-flowing, non-stick powder.

U.S. Pat. No. 1,646,657 to O'Connell describes a honey food product consisting of honey and agar. To make the product, honey is strained and heated. Thereafter, an aqueous mixture of agar and water of up to 31% by weight are added to the heated strained honey. The honey and agar mixture is then cooled to form a honey product in the form of a jelly which is not subject to crystallization or deterioration when exposed to air and which may be spread, with facility, on bread or other food.

U.S. Pat. No. 2,295,274 to Walker, discloses a method of preparing a homogeneous honey pectin composition. To make the composition, honey is heated and dissolved in water. Thereafter, pectin is added and the combined mixture is heated once again. The mixture is then cooled to yield a firmer, self-supporting and self-sustaining honey compound.

As should be apparent, research in this field is continuing to develop new honey products, which overcome further the above-mentioned problems.

It is therefore, an object of the present invention to provide a novel honey product.

According to one aspect of the present invention, there is provided a sliceable, crystallized honey product comprising from 75% to 90% by weight honey and from 10% to 25% by weight finely ground oil-rich nut products.

Preferably, the honey product includes from 11% to 18% by weight nut products. It is also preferred that the nut products are in the form of either nut meal or nut flour, and that they are derived from mild roasted peanuts or almonds.

In another aspect of the present invention there is provided a sliceable crystallized honey product comprising from 75% to 90% by weight honey and from 10% to 25% by weight finely ground oil-rich nut products, said honey having a solids content of from 75% to 86% by weight of the honey and said nut products being selected from at least one of nut meal and nut flour.

Preferably, honey having a solids content of about 82% by weight of the honey is used, and forms from 76% to 86% by weight of the honey product. It is also preferred that the nut products are derived from mild roasted peanuts and that the product is formed using a modified Dyce method.

A method of forming a honey product is also provided. Honey with a selected glucose fraction and moisture level is pasteurized under controlled time and temperature conditions. Preferably the glucose fraction is from 38% to 40% by weight of the honey, and the moisture level is maintained at about 18% by weight of the honey. Thereafter, nut products are added to the warm honey and the moisture level of the honey and nut products mixture is adjusted to about 18% by weight of the mixture. The honey and nut products are then mixed until the particles are evenly distributed and the mixture is cooled to about 24° C. Seed honey is then blended with the honey-nut products mixture. The resulting composition is held at 12° C. to 13° C. to form a honey product.

The present honey product provides advantages over previously developed honey food products in that the present honey product can be readily sliced into individual portions which can be subsequently packaged in a manner similar to processed cheese. Moreover, the product maintains a typical "honey flavour" in combination with a roasted nut flavour, a resultant taste which is less sweet than pure honey.

An embodiment of the present invention will now be further described by way of example only with reference to the accompanying figures in which:

FIGS. 2a, 2b and 2c are graphs illustrating the effect of selected additives on the textural properties of honey blocks; and FIGS. 3a, 3b and 3c are graphs illustrating further the effect of selected additives on the textural properties of honey blocks.

Figure 1:
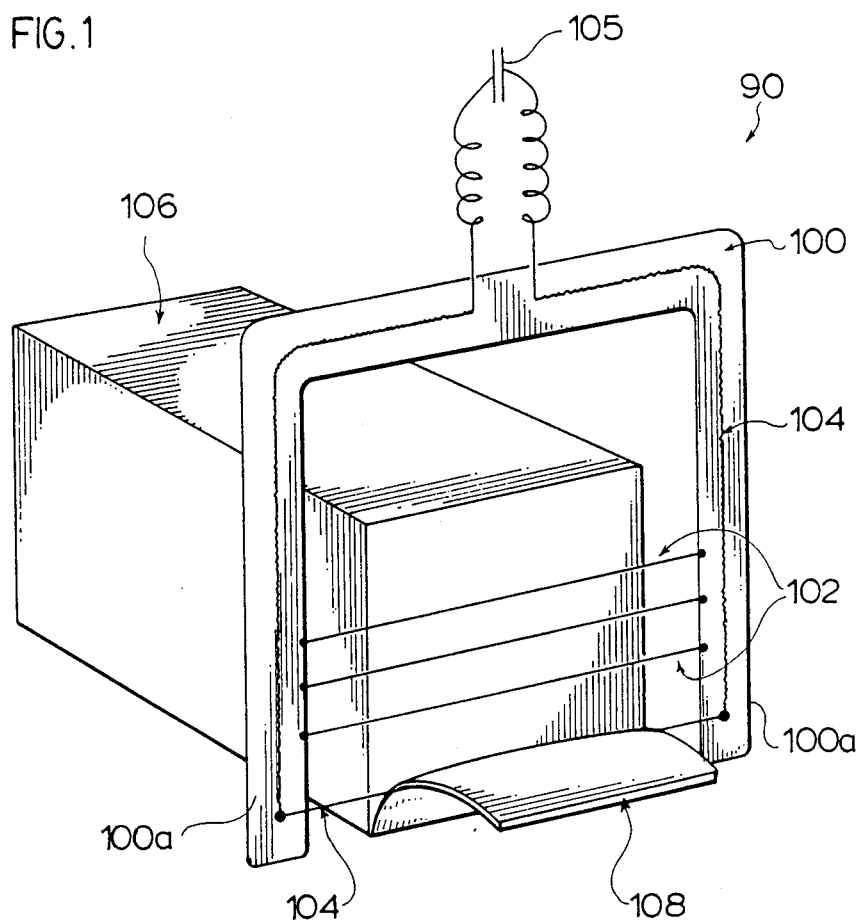
FIG. 1 shows a front view of a honey block being sliced.

The main ingredient in the present food product is honey which is mixed with oil-rich nut products to result in a honey product having improved texture for handling. In particular, the present invention increases the sliceability of the honey product by decreasing the stickiness of the honey product whilst lowering the hardness and cohesiveness of the honey product to a desirable level. This results in a honey product which can be individually sliced and packaged. These features also allow the product to be spread.

Typical extracted honey has a solids content of from about 79% to about 85% and a water content of from about 15% to about 21%, the contents of solids and water being based on the total weight of the honey. For the purpose of this disclosure, honey as referred to herein shall include both water and solids. In forming the honey product of the present invention, it is preferred to use honey having a solids content from 81% to 83% by weight of the honey. As mentioned above, the honey is mixed with oil-rich nut products to form the honey product in accordance with the present invention.

Preferably, the nut products are derived from mild-roasted peanut products and are selected from the group including peanut meal and peanut flour. It is preferred that the amount of peanut products added to the honey be in the amount of from 10% to 25% by weight of the final honey product and that the honey, excluding water, forms approximately 57% to 75% by weight of the final honey product. It has been found that peanut meal in the amount of about 20% by weight of the final honey product or peanut flour in the amount of about 15% by weight of the final honey product produce favourable results yielding a sliceable honey product.

Referring to FIGS. 2 to 3, graphs illustrating effects of various products on the texture of crystallized honey are shown. As can be seen from FIGS. 2a to 2c, and 3a to 3c, peanut meal and peanut flour, when added to honey in accordance with the present invention, reduce the peak force (hardness) and cohesiveness of the resulting honey product as compared to pure crystallized honey (control). A Voland Texture Analyzer was used to measure the peak force (at a selected deformation), adhesiveness (extension after deformation) and cohesiveness (ratio of peak force to adhesive force) of the final mixed products. As is illustrated, although the honey-peanut meal and honey-peanut flour mixtures do not alter the adhesiveness of the honey product, they do yield a sliceable honey product due to the combined effects of these three parameters. However, other additives, while altering some of the tested parameters, do not yield a resultant honey product with sliceable properties.

The peanut meal and peanut flour bring about the beneficial effect on the sliceability through their oil-rich composition. Since peanut oil alone does not produce similar sliceabilty, it is believed that the oil component must exist in a bound form within the granular particles.

The above honey product is made using the Dyce method (1931) for producing crystallized honey which is well known in the art. However, when using this method to form the honey product in accordance with the present invention, the specific chemical and processing conditions listed below in Table 1 are chosen.

TABLE 1

| FACTOR | RANGE OF LEVELS |
|---|---|
| Glucose Fraction (%)* | 38–40 |
| Moisture (%)* | 18 |
| Seed (%) | 11–12** |
| Holding Time (days at 12° C.) | 12–14 |

*By weight of honey.
**Percentage of honey added to the honey nut products mixture.

In particular, to form the honey product in accordance with the present invention, honey is initially pasteurized at 80° C. for 7.5 minutes and cooled to 35° C. The selected peanut product is incorporated into the honey using a colloid mill and mixed thoroughly to ensure even particle distribution. The honey peanut product mixture is then transferred to a vat and mixed thorougly with previously ground seed honey at 24° C. During this process, the moisture level is maintained at about 18% by weight of the mixture by adding water when required and by controlling the time and temperature during processing.

The blended honey product is then poured into molds which are subsequently covered to prevent moisture loss and then stored at from 12° C. to 13° C. for 12 to 14 days. The blocks of honey product are then removed from the molds and sliced using the cutting device 90 illustrated in FIG. 1.

The cutting device 90 comprises a U-shaped frame element 100 supporting a slicing wire 104 which is connectable to a potential voltage source 105 to heat the wire. When the frame 100 is positioned so that the arms 100a thereof straddle a block of honey product 106 formed in accordance with the present invention, the heated wire 104 can be brought in contact therewith so that a cut may be made through the block of honey product 106. Supporting guide wires 102 are fastened to the U-shaped frame 100 to assist in the separation of a slice 108 from the honey block 106.

Once the block of honey product 106 is cut into the desired slices 108, the slices 108 are individually packaged and returned to cold storage. Once stored, the individual honey product slices 108 exhibit no further change in texture.

An embodiment of the present invention will now be described with reference to the following non-limiting Example.

EXAMPLE 1

A honey composition was formulated using the following ingredients and quantities:

| Ingredient | Quantity (grams) |
|---|---|
| Step 1 | |
| Honey (82% solids)* | 100 |
| Peanut flour | 20 |
| Water (moisture adjustment) | 4.4 weight or volume |
| Step 2 | |
| Seed honey | 13.7 |

*By weight of honey.

To yield the above exemplified honey product, honey that had been previously pasteurized under controlled time and temperature conditions was allowed to cool prior to processing. The honey was placed in a colloid mill with an adjustable gap and heated slightly. Moisture determinations were made on the honey and water was added, as necessary, to the honey to correct for low moisture. Appropriate levels of peanut products were added to the warm honey. The final honey product comprises 67.5% honey solids, 18.0% moisture and 14.5% peanut products by weight of the final honey product.

Moisture was added with the peanut products to ensure that the solids content of the honey stayed below 82% by weight of the honey. The milling procedure generated sufficient energy which was dissipated in the form of heat to warm the honey mixture, and therefore mixing was carefully controlled.

The honey peanut product blend was allowed to cool to room temperature (approx. 24° C.) and transferred to a separate vessel, fitted with a rotating scraper arm. Seed honey (11% w/w at 22° C.) was combined with the honey-peanut composition and mixed for at least five minutes. The composition was transferred into molds and was covered with plastic films and then stored at 12° C. and about 55% RH for a minimum of 12 days.

The solidified honey product blocks were removed from the molds and sliced using the heated wire cutting device and individually wrapped. The honey slices had an elastic texture and were cohesive without excess stickiness. The product was stable at 12° C. for an extended period of time and had desirable organoleptic properties.

As should be apparent from the above, the addition of oil-rich nut products and in particular, peanut meal and peanut flour to honey undergoing crystallization via the modified Dyce method under controlled conditions, increases the sliceability of the resulting honey product. This is due to the change in the textual characteristics of the resultant product as compared with a block of pure honey. Although the use of peanut products has been exemplified, it is within the scope of the present invention to use other nut products that are of a comparable chemical composition and particle size to the peanut products and are processed in a similar manner. Non-limiting examples of such products include almonds, Brazil nuts, cashews, pecans and walnuts.

It is also believed that whole nuts would produce a similar honey product assuming that their compositions are not significantly different from the peanut products since the nuts would be ground to similar consistency in the colloid mill.

It should be apparent to one of skill in the art that the present invention can be modified without departing from the scope thereof as defined by the appended claims.

We claim:

1. A sliceable, crystallized honey product comprising from 75% to 90% by weight honey and from 10% to 25% by weight finely ground oil-rich nut products.

2. The honey product as defined in claim 1 wherein said honey product includes from 10% to 20% by weight nut products.

3. The honey product as defined in claim 2 wherein said honey product includes from 11% to 18% by weight nut products.

4. The honey product as defined in claim 2 wherein said nut products include at least one selected from the group consisting of nut meal and nut flour.

5. The honey product as defined in claim 3 wherein said nut products include at least one selected from the group consisting of nut meal and nut flour.

6. The honey product as defined in claims 4 or 5 wherein said nut products are derived from at least one selected from the group consisting of peanut and almond.

7. The honey product as defined in claim 4 wherein said nut products are derived from mild roasted peanuts.

8. The honey product as defined in claim 5 wherein said nut products are derived from mild roasted peanuts.

9. A sliceable, crystallized honey product comprising from 75% to 90% by weight honey and from 10% to 25% by weight finely ground oil-rich nut products, said honey having a solids content ranging from 75% to 86% by weight of the honey and said nut products including at least one selected from the group consisting of nut meal and nut flour.

10. The honey product as defined in claim 9 wherein said honey product includes from 10% to 20% by weight nut products.

11. The honey product as defined in claim 10 wherein said honey product includes from 11% to 18% by weight nut products.

12. The honey product as defined in claim 10 wherein said nut products are derived from at least one selected from the group consisting of nut meal and nut flour.

13. The honey product as defined in claim 12 wherein said nut products are derived from mild roasted peanuts.

14. A sliceable, crystallized honey product comprising from 75% to 90% by weight honey and from 10% to 25% by weight finely ground oil-rich peanut products, said honey having a solids content of from 75% to 86% by weight of the honey, said peanut products including at least one selected from the group consisting of peanut meal and peanut flour.

15. The honey product as defined in claim 14 wherein said honey has a solids content of about 82% by weight of said honey and wherein said honey product includes about 18% by weight moisture.

16. The honey product as defined in claim 15 wherein said honey product includes about 67.5% by weight honey solids, 18.0% moisture and 14.5% by weight peanut products.

17. A method of forming a crystallized honey product, said honey product including from about 75% to 90% by weight honey and from 10% to 25% by weight nut products, said method, comprising the steps of:
   (i) mixing warmed honey having a solids content of from 75% to 86% by weight with said nut products;
   (ii) combining previously pasteurized creamed honey to the mixture of step (i);
   (iii) mixing the creamed honey and mixture thoroughly; and
   (iv) whereas steps (i), (ii) and (iii) being performed whilst maintaining the moisture level of the mixtures of steps (ii) and (iii) and adding seed honey to said mixture of step (ii) at levels to yield the honey product in a crystallized form.

18. The method of claim 17 wherein the glucose fraction of said honey is from 38% to 40% by weight of said honey and wherein the moisture level and seed honey are maintained at levels of from 17% to 18.5% and from 9% to 12%, respectively, by weight of the honey product.

19. The method of claim 18 wherein said nut products are derived from peanuts and wherein said peanut products include at least one selected from the group consisting of peanut meal and peanut flour.

20. The method of claims 17 or 19 further comprising the steps of maintaining said seed honey and mixture combination at a temperature of about 12° C. for a period of from 12 to 14 days; and
   slicing said honey product into individual portions.

21. A method of forming a sliceable crystallized honey product, said honey product including from about 75% to 90% by weight honey from 10% to 25% by weight finely ground nut products, said method, comprising the steps of:
   (i) mixing warmed honey having a solids content of from 75% to 86% by weight with said nut products;
   (ii) combining previously pasteurized creamed honey to the mixture of step (i);
   (iii) mixing the creamed honey and mixture thoroughly; and
   (iv) whereas steps (i), (ii) and (iii) being performed whilst maintaining the moisture level of the mixtures of steps (ii) and (iii) and adding seed honey to said mixture of step (ii) at levels to yield the honey product in a crystallized form.

* * * * *